United States Patent Office 3,634,227
Patented Jan. 11, 1972

3,634,227
OIL SLICK ELIMINATION
William B. Patterson, Jr., Houston, Tex., assignor to Dresser Industries, Inc., Houston, Tex.
No Drawing. Filed Sept. 9, 1969, Ser. No. 856,492
Int. Cl. E02b 15/04
U.S. Cl. 210—11                                    4 Claims

ABSTRACT OF THE DISCLOSURE

A method for rendering innocuous and/or eliminating an oil slick on a body of water by using an oil absorbent clay. An emulsifier can be used to allow the clay to sink in the body of water after absorbing the oil of the oil slick.

BACKGROUND OF THE INVENTION

Heretofore problems have been encountered in oil slicks causing damage to wildlife and property, particularly along shorelines.

Attempts have been made to destroy or confine oil slicks by burning same or confining same within a floating fence. These approaches are, inter alia, either inherently dangerous or difficult to employ with very large oil slicks.

Thus, it is desirable to have a procedure by which oil slicks can be eliminated no matter how large an area is covered and without any danger to personnel, property, or wildlife from burning and the like.

SUMMARY OF THE INVENTION

According to this invention an oil slick is rendered innocuous by spreading over the slick a subdivided, oil absorbent clay and allowing the clay to absorb the oil from the slick. The slick is then eliminated by removing the oil bearing clay from the surface of the water.

The oil bearing clay can be removed from the surface of the water by physically separating the clay from the water and hauling same away or by adding to the clay one or more emulsifiers in amounts which reduce the surface tension of the water sufficiently to allow the oil bearing clay to sink in the body of water.

The method of this invention is quite safe in that it does not involve burning or emplacing a large floating fence from a boat. Further, the method of this invention is not limited by the surface area covered by the oil slick since the clay and emulsifier, if used, can be emplaced on the slick from the air using techniques already known and employed in crop dusting and fire fighting with airplanes.

Once the clay has absorbed the oil of the oil slick, the slick is rendered substantially innocuous in that the oil bearing clay can come in contact with land, boats, other property, and wildlife without depositing substantial amounts of oil thereon. Thus, the oil bearing clay can be forced up to and even onto the shoreline, skimmed from the surface of the water, and hauled away in dump trucks without damaging the shoreline or any wildlife that may come into contact with the clay during this procedure.

If desired, the oil bearing clay can be disposed of without ever bringing same into contact with land by adding thereto at least one emulsifier in an amount which reduces the surface tension of the water sufficiently to allow the oil bearing clay to sink in the body of water. The oil bearing clay can then be left in the body of water where the bacteria and/or enzymes which naturally occur in the water to digest the oil. In this procedure, it is preferable to use a biodegradable emulsifier so that the same bacteria and enzymes which digest the oil also digest the emulsifier leaving only the clay.

Accordingly, it is an object of this invention to provide a new and improved method for rendering oil slicks innocuous. It is another object to provide a new and improved method for eliminating oil slicks. It is a particular object to provide a method for eliminating an oil slick without ever contacting land. It is a further object to provide a new and improved method for eliminating oil slicks from the surface of the water and also for eliminating the oil from the water in toto without contacting land.

Other aspects, objects, and advantages of the invention will be apparent to those skilled in the art from the disclosure and the appended claims.

DETAILED DESCRIPTION OF THE INVENTION

According to this invention an oil slick is rendered innocuous by spreading over the slick a subdivided, oil absorbent clay such as attapulgite, bentonite, kaolin, and mixtures thereof, and allowing the clay to remain in contact with the oil a time sufficient for the clay to absorb substantially all the oil. This contact time is generally on the order of a few minutes, for example from about 1 to about 5 minutes although shorter and longer contact times are feasible and may be necessary depending upon the composition and nature of the oil, the particular clay employed, and the physical condition of the clay.

Generally, the clay must be subdivided sufficiently to render same floatable on the water. The clay can be subdivided so that substantially all passes an 8 mesh screen (U.S. Standard Series). The amount of clay employed will vary widely depending upon the thickness of the oil in the slick, the area covered by the slick, and the like, but will generally be that which is sufficient to absorb substantially all the oil present in the slick.

After the clay has absorbed the oil, the oil slick has been rendered innocuous since the clay will retain the oil in preference to releasing the oil to coat any subject matter, e.g., land, boats, wildlife, and the like, with which it comes into contact. Thus, the oil bearing clay can be removed from the surface of the water using any conventional procedure such as simply skimming the clay from the surface of the water, forcing the clay onto land and hauling the clay away, and the like.

The clay can be spread on the oil slick in any conventional manner such as dumping the clay from an airplane flying overhead, or from a boat passing around and/or through the oil slick.

If it is desired to remove the oil bearing clay from the surface of the water without having to haul the clay any distance or without having the clay come into contact with any land whatsoever, sufficient conventional emulsifiers can be employed in amounts which reduce the surface tension of the water sufficiently to allow the oil bearing clay to sink in the body of water thereby disposing of the clay in situ. This disposal procedure has an advantage in that the bacteria and/or enzymes which naturally occur in the body of water are utilized to digest the oil in the clay thereby removing the oil as such in toto from the body of water.

If desired, additional bacteria and/or enzymes can be employed with the clay and/or emulsifier, preferably clay if the emulsifier is biodegradable, to supplement those bacteria and/or enzymes which naturally occur in the body of water thereby aiding and speeding the oil digestion procedure.

When bacteria and/or enzymes are relied upon to digest the oil, it is preferable to use an emulsifier which is biodegradable so that the bacteria and/or enzymes can remove the emulsifier as such as well as the oil from the water thereby leaving only clay, an innocuous material.

Substantially any commercial emulsifier, biodegradable or otherwise, can be employed in this invention and therefore the amount of emulsifier employed will vary widely depending upon the inherent properties and capabilities of the emulsifier or combination of emulsifiers used. Generally, at least about 0.001 weight percent of one or more emulsifiers, based on the total weight of the clay spread on the oil slick, can be employed.

Suitable emulsifiers, which are also biodegradable, include those having the formulae

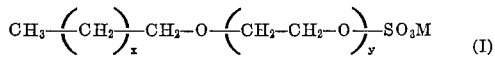  (I)

and

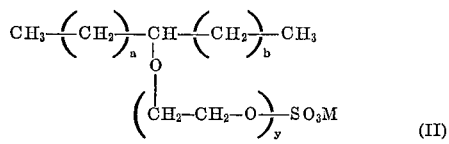  (II)

where $x$ is from 4 to 20, preferably 8 to 16, inclusive, $y$ is from 1 to 10, preferably 1 to 5, inclusive, $a$ is from 0 to 9, inclusive, $b$ is from 0 to 9, inclusive, $a$ plus $b$ is from 3 to 19, inclusive, and M is selected from the group consisting of alkali metals, alkaline earth metals, and ammonium. The alkali metals include lithium, sodium, potassium, rubidium, cesium, and francium, preferably lithium, sodium, potassium, and rubidium. The alkaline earth metals include beryllium, magnesium, calcium, strontium, barium, and radium, preferably magnesium, calcium, strontium, and barium.

This invention is applicable to any body of water, be the water fresh, salt water, brine, sea water, and the like.

EXAMPLE

On oil slick was created on a body of fresh water by dispersing crude oil on the surface thereof. Attapulgite clay subdivided to all pass a 16 mesh screen and be retained on a 20 mesh screen, both screens being of the U.S. Standard Series, was spread over the oil slick so as to substantially completely cover the oil slick with the attapulgite.

The attapulgite was left in contact with the oil slick for about 1 minute. Thereafter, an emulsifier was employed which had a formula according to Formula I hereinabove wherein M was sodium. The emulsifier was a mixture of molecules having from 12 to 14 carbon atoms total and wherein $y$ was 3 the remainder being methyl and methylene radicals as shown in Formula I. The emulsifier was added until the oil bearing clay sank to the bottom of the body of water.

The clay can then be left at the bottom of the body of water indefinitely allowing the bacteria and enzymes in the water an unlimited amount of time to digest the oil and emulsifier and completely remove both as such from the body of water.

Reasonable variations and modifications are possible within the scope of this disclosure without departing from the spirit and scope of this invention.

The embodiments of the invention in which an exclusive property or privilege is claimed are defined as follows:

1. A method for eliminating an oil slick on the surface of a body of water comprising:
   (1) spreading over said slick a subdivided oil absorbent clay, said clay being sufficiently subdivided to be floatable on said water,
   (2) allowing said clay to absorb said oil, and
   (3) depositing on said oil-bearing clay at least one emulsifier in amounts which reduce the surface tension of the water sufficiently to allow the oil-bearing clay to sink in said body of water.

2. The method according to claim 1 wherein said clay is attapulgite subdivided so that the particles substantially all pass an 8 mesh screen, and said emulsifier is at least one biodegradable material of the formulae

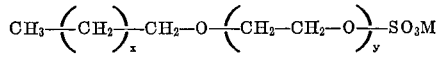

and

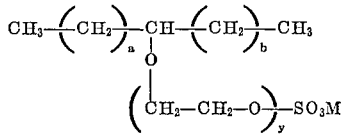

where $x$ is from 4 to 20, preferably 8 to 16, inclusive, $y$ is from 1 to 10, preferably 1 to 5, inclusive, $a$ is from 0 to 9, inclusive, $b$ is from 0 to 9, inclusive, $a$ plus $b$ is from 3 to 19, inclusive, and M is selected from the group consisting of alkali metals, alkaline earth metals, and ammonium. The alkali metals include lithium, sodium, potassium, rubidium, cesium, and francium, preferably lithium, sodium, potassium, and rubidium. The alkaline earth metals include beryllium, magnesium, calcium, strontium, barium, and radium, preferably magnesium, calcium, strontium, and barium, said emulsifier being added in an amount of at least about 0.001 weight percent based on the weight of clay spread on the oil slick.

3. The method according to claim 1 wherein additional bacteria and/or enzymes are employed with at least one of the clay and the emulsifier to supplement those naturally occuring in said body of water.

4. The method according to claim 1 wherein said clay is at least one of attapulgite, bentonite, and kaolin.

References Cited
UNITED STATES PATENTS

| | | | |
|---|---|---|---|
| 2,003,314 | 6/1935 | Russell et al. | 210—36 |
| 2,367,384 | 1/1945 | Tymstra et al. | 210—36 |
| 2,464,204 | 3/1949 | Baker | 210—36 |
| 3,152,983 | 10/1964 | Davis et al. | 210—11 |
| 3,502,566 | 3/1970 | Raymond et al. | 210—11 X |

SAMIH N. ZAHARNA, Primary Examiner

U.S. Cl. X.R.

210—40, DIG. 21